R. J. GILL & J. SCHOENFELD.
TARGET PLOTTING BOARD.
APPLICATION FILED MAR. 5, 1914.

1,165,330.

Patented Dec. 21, 1915.
7 SHEETS—SHEET 7.

WITNESSES:
Charles Pickels
Thos Cushberg

INVENTORS
Robert J. Gill
Joseph Schoenfeld
BY G. H. Strong.
ATTORNEY

UNITED STATES PATENT OFFICE.

ROBERT J. GILL AND JOSEPH SCHOENFELD, OF SAN FRANCISCO, CALIFORNIA.

TARGET PLOTTING-BOARD.

1,165,330.  Specification of Letters Patent.  Patented Dec. 21, 1915.

Application filed March 5, 1914. Serial No. 822,558.

*To all whom it may concern:*

Be it known that we, ROBERT J. GILL and JOSEPH SCHOENFELD, citizens of the United States, residing in the city and county of San Francisco and State of California, have invented new and useful Improvements in Target Plotting-Boards, of which the following is a specification.

This invention relates to a plotting board, and particularly to improvements over the so-called Whistler-Hearn plotting-board now in use by the United States Coast Artillery.

A plotting board is an instrument, provided for the purpose of locating the range and azimuth of a target, and also for finding the range and azimuth of the set-forward point of a moving target.

The object of the present invention is to provide means for automatically positioning the gun arm at the point of intersection where the primary and secondary arms cross.

Another object of the invention is to arrange the primary and secondary arms in such a manner that they may be operated beneath the under-surface of the plotting board where they cannot interfere with the tracking operations.

A further object is to provide means for locating the point of intersection of the three arms; that is, the primary and secondary arms and the gun arm, which are stationed below the surface of the board, and mark said position on the upper surface of the board, and to provide means for mechanically and instantaneously finding the range of the set-forward point by the operation of setting the primary and secondary arms. This mechanical and instantaneous finding of the range of the set-forward point is also provided with an object in view of preventing danger of personal error.

Further objects will hereinafter appear.

The invention consists of the parts and the construction, and combination of parts as hereinafter more fully described and claimed, having reference to the accompanying drawing in which—

The improved form of plotting board here shown is devised for use with base lines of length similar to those now in use in the Coast Artillery of the United States. This board can be used as a right-handed or left-handed board, accordingly, as the board is made up for the right or left handed base lines; that is, it can be used only as a right-handed board, provided that the primary station is on the right of the secondary station, or vice versa.

The plotting board proper consists of a semi-circular table A, constructed of well-seasoned lumber, approximately 2″ thick. The outer radius of the board is approximately 45″ more or less, and the board is so made as to allow for expansion and contraction, and to prevent warping. The table is supported by a steel frame, consisting of an angle iron 2, mounted on standards B, and a channel iron 3, known as the main azimuth circle. The main azimuth circle is a curved steel channel, with the channel facing inward to support the outer edge of the plotting board. The outer ends of the several sections which comprise the board are carried by the channel and the angle iron 2. The channel is approximately 2″ deep, and has an approximate radius of about 190° to allow for the orientation of the base line. An aluminum surface strip 4, secured to the top of the channel carries the azimuth numbers as indicated at 5. The base line arm consists of a pair of bronze strips 6 and 7 about 4″ wide; these run parallel with the upper and lower surfaces of a 3″ channel-beam indicated at 8. This beam is placed back from the board, and below it sufficiently so that the pintle center may be adjusted to conform to base line now in use by the United States Coast Artillery.

The base line strips 6 and 7 are attached to the channel beam 8 by any suitable means. The outer ends of the base line arm are provided with screws which project through slots in the azimuth circle so that when the base line arm is not fastened by the screws, the base line may be moved back and forward in the slots to permit of proper orientation in azimuth whenever it may be found necessary to orient the base line.

The guide plates 9′ are end extensions of the main azimuth circle, and are made of bronze; these are provided with verniers to correspond with the verniers on the base line ends.

About an inch below, and running along the main azimuth circle in concentric position with relation to same, is secured a toothed rack 10, made of bronze. The distance from center to center of each tooth corresponds 1/10 of a degree in azimuth. This rack is provided for the purpose of operating the hundredths degree dials mounted on the primary station and secondary auxiliary stations.

The primary station and secondary auxiliary station are mounted in guide blocks 12 and 13, and these are in turn slidably mounted upon a track-way 14, suitably secured on the lower face of the outer channel member 3.

15 and 16 indicate a pair of station blocks. Block 15 being known as the primary block is stationary, being secured to the undersurface of the lower base line strip as indicated at 17. The other station block indicated at 16 is known as the secondary block; that is, however, adjustably secured to the same strip for purposes hereinafter to be described. Pivotally secured on the outer ends of the primary and secondary station blocks as at 18—19 are a pair of bracket members 20 and 21, in which are journaled the inner ends of the respective primary and secondary arms.

Figures 3, 4, 5, 6:
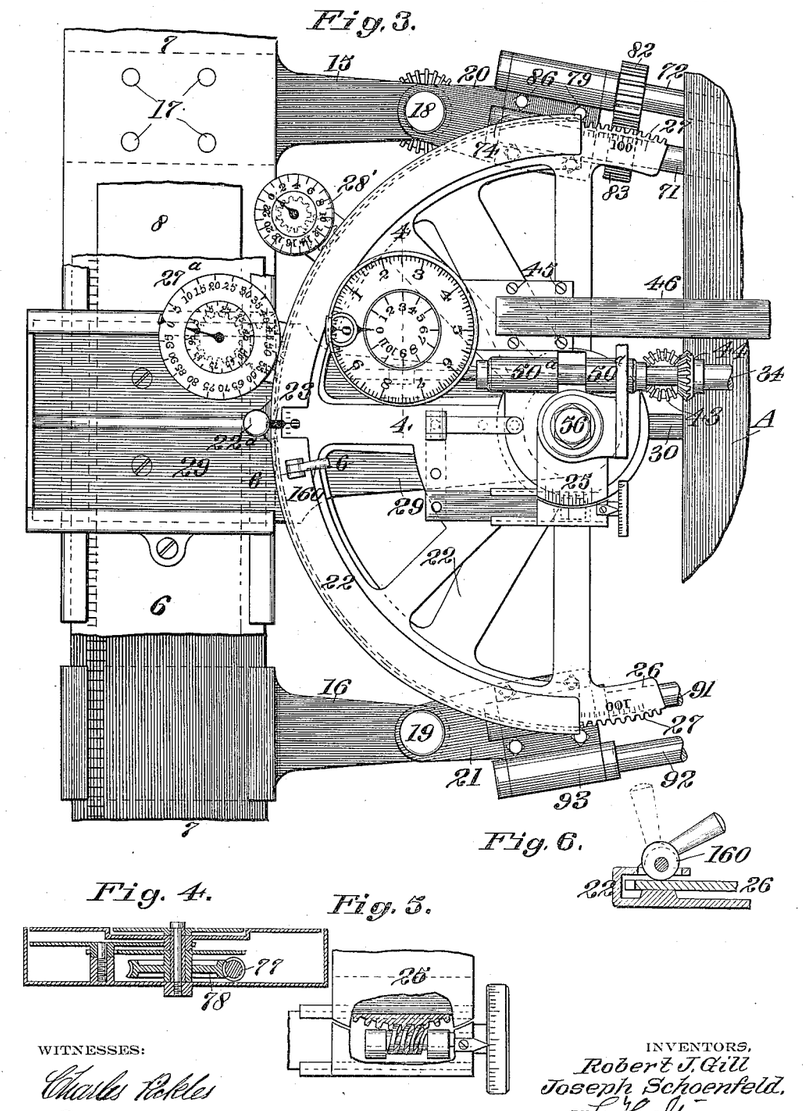
Fig. 3 is an enlarged detail plan view of the limb, and also showing the pivotal connection of the primary and secondary arms to their respective stations.
Fig. 4 is a cross section on line 4—4 of Fig. 3, showing a gear connection of the hundredths dial.
Fig. 5 is an enlarged detail plan view partly in the section of the micrometer azimuth correction device.
Fig. 6 is a cross section on line 6—6 of Fig. 3, showing the locking clamp.
Figures 15, 17:
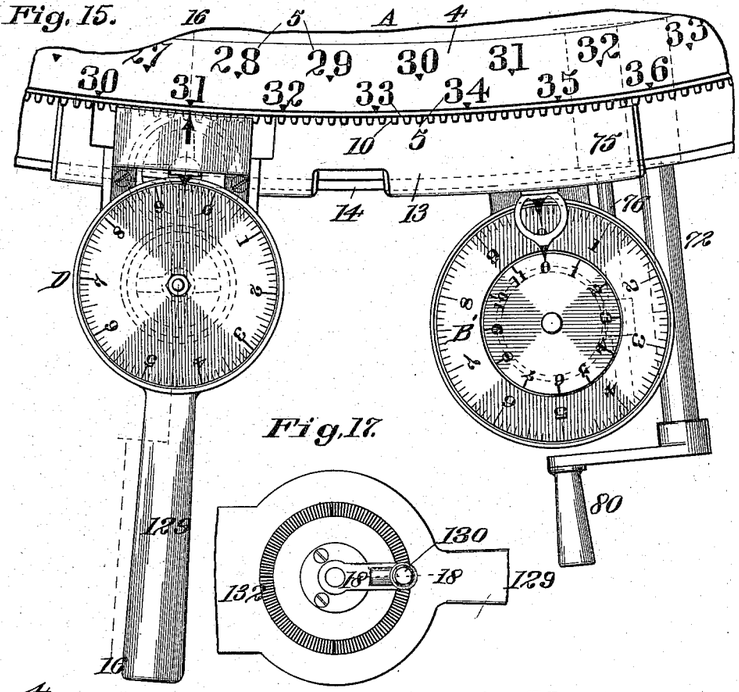
Fig. 15 is an enlarged detail plan view of the azimuth scale, showing the position of the outer end of the primary arm with relation to same.
Fig. 17 is a bottom view of the secondary arms hundredths dial, showing the locking mechanism for the crank arm.

By referring to Figs. 1 and 7 in particular, it will be seen that the primary and secondary station blocks with connected arms are mounted below the surface of the table where they cannot interfere with the plotting operations of the upper surface of the board. The detailed construction of the primary and secondary arms and a connecting mechanism hereinafter to be known as the intersection device will be as follows: The primary station arm consists of the primary arm 71 and a secondary arm 72, known as the primary power arm. Arm 71 is a spiral shaft which passes through a sleeve member 73, carried by the intersection device 33. The inner end of shaft 71 is journaled as at 74 in bracket member 20, and the outer end of said shaft is journaled in sliding block 13 as indicated by dotted lines in Fig. 25. The extreme end of shaft 71 is considerably reduced in diameter as indicated at 76, and secured to the outer end of the said reduced section is a worm gear 77 which intermeshes with the worm gear 78, which operates the primary station arm range dial B′. This range dial is constructed in the usual manner and is clearly indicated in plan view of Fig. 15, and in cross section of Fig. 4. The primary power arm 72 is a worm shaft, the inner end of which, is also journaled in bracket 20 as indicated at 79. The outer end of said shaft is journaled in the sliding block 13, and is provided with a hand crank 80 by which it may be turned. The central portion of said shaft engages with a worm wheel 81, formed on the hub member 82, carried by the intersection device 33. By referring to Figs. 3 and 7 it will be seen that the inner end of the power arm 72 is provided with a spur gear 82, which intermeshes with a similar gear 83, here shown as secured upon a short shaft section 84, journaled as at 85 in a bearing member, and which is secured by bolts 86 to the lower side of the primary bracket 20. Secured to the inner end of shaft 84 is a bevel gear 87, and intermeshing with said gear is a second bevel gear 88, which is journaled upon an extension 89, formed upon the lower end of pivot member 18, and secured to the lower face of the bevel gear 88 is a hand crank 90 by which rotary motion may be transmitted to the power arm through gears 88, 87, 83 and 82. The operation of the power arm 72 and the primary arm 71 with relation to the sleeve 73 and worm 81 will later be described.

Figures 19, 20, 21, 22, 23, 24, 25:
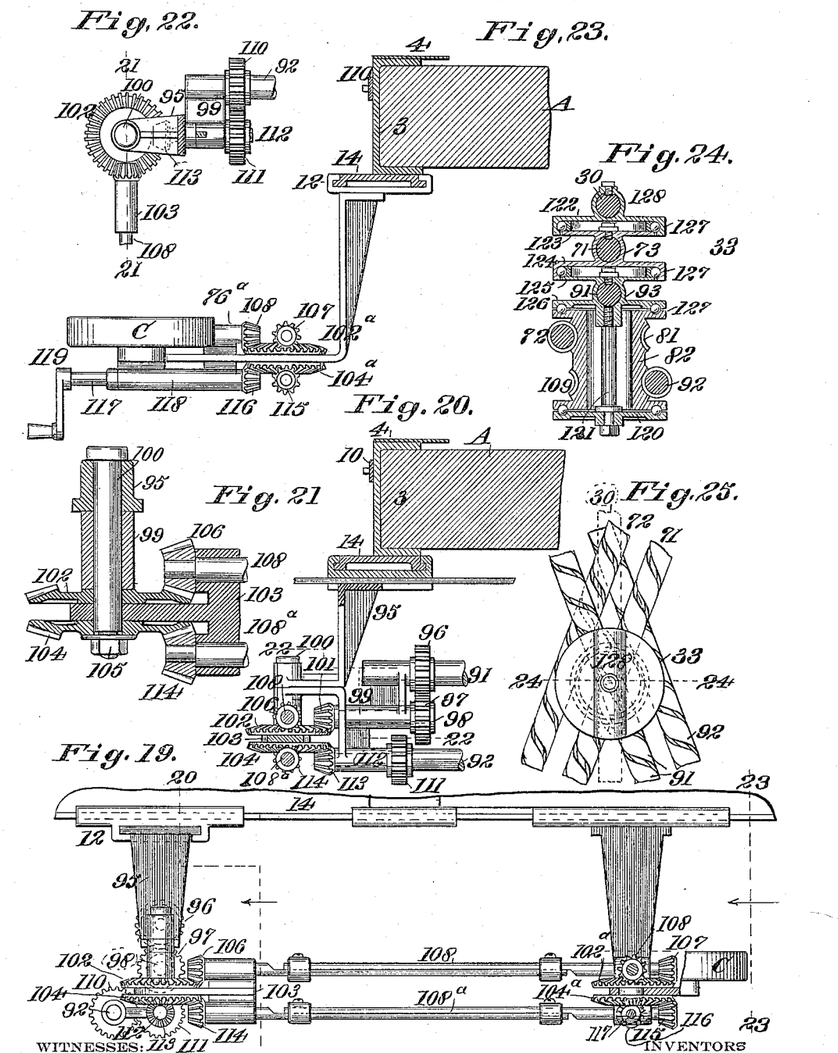
Fig. 19 is a detail enlarged front elevation, showing the connection between the secondary auxiliary station and the secondary arm.
Fig. 20 is a cross section on line 20—20 of Fig. 19.
Fig. 21 is an enlarged cross section on line 21—21 of Fig. 22.
Fig. 22 is a horizontal section on line 22—22 of Fig. 20.
Fig. 23 is a vertical section on line 23—23 of Fig. 19.
Fig. 24 is a vertical section on line 24—24 of Fig. 25.
Fig. 25 is a plan view of Fig. 24, showing relative positions of the primary and secondary arms.

The secondary station arm consists of the secondary arm 91 and the secondary power arm 92. The secondary arm 91 is a spiral shaft, which passes through a sleeve 93, which forms a part of the intersection device 33. The inner end of the shaft is journaled in a bearing member 94, carried by the secondary station bracket 21, and the outer end of the shaft is journaled in the sliding block 95 hereinafter to be known as the secondary sliding block. The main secondary sliding block has previously been indicated by numeral 12. The secondary arm is provided for the same purpose as the primary arm; that is, it is provided in this instance for the purpose of operating the secondary arm range dial indicated at C. Means must therefore be provided by which the revolution of the secondary shaft may be transmitted from the auxiliary sliding block to the secondary sliding block 12 to operate the range dial C. The gear connections provided for this purpose can mostly be traced by referring to Figs. 19, 20 and 23. Secured upon the outer end of the secondary arm is a spur gear 96, which intermeshes with a similar gear 97, which is secured upon the inner end of a short shaft section 98, journaled in a bracket 99, pivotally secured as at 100 to the lower face of the auxiliary sliding block 95. The inner end of shaft 98 carries a bevel gear 101, which intermeshes with a horizontally positioned bevel gear 102, mounted upon an extension formed in the lower end of pivot member 100. Pivotally mounted below gear 102 is a bearing bracket 103, and turnably mounted upon pivot member 100, below bracket 103 is a second bevel gear 104. Bracket members 99 and 103, together with bevel gears 102 and 104 are all supported by nut 105, secured to the lower end of pivot member 100. The enlarged vertical section of bearing brackets 99 and 103, with connected gears 102 and 104, together with pivot member 100 is shown in Fig. 21. Suitably secured to the lower side of the secondary sliding block 12 is a pair of bevel gears 102$^a$ and 104$^a$, and connecting gears 102 and 102$^a$ are a pair of bevel pinions 106 and 107, which are secured upon the shaft 108, which in turn is journaled at one end in bracket 103, and at the other end in the lower portion of sliding block 12. Intermeshing with the worm wheel on the secondary range dial C is a worm gear similar to the worm 77 previously described in connection with the primary arm range dial. The worm gear in this case is also carried by a reduced shaft 76$^a$. Referring to Figs. 1 and 19, secured upon the opposite end of the reduced shaft section 76$^a$ is a bevel pinion which intermeshes with gear 102$^a$. It can thus be seen that any revolving motion of the secondary arm of spiral shaft 91, will be transmitted through gears 96, 97, 101, 102, 106, 107, 102$^a$ and 108, which are secured to the reduced shaft 76$^a$, which in turn transmits movement through worm gears and wheels similar to those described in connection with the operation of the primary station arm range dial.

The secondary power arm 92 is a worm shaft, the inner end of which is journaled in bearing member 93, secured to bracket 21; the outer end of same is journaled in bracket 99, carried by the auxiliary sliding block 95, and the worm shaft 92 is so positioned as to become engageable with the worm wheel 109, formed upon the hub bearing 82 in a manner similar to worm wheel 81. Suitably secured to the outer end of the worm shaft is a spur gear 110, and intermeshing with same is a second gear 111, which is secured upon the short shaft section 112, and journaled in the bearing bracket 103. Secured to the inner end of shaft 112 is a bevel pinion 113, which intermeshes with the lower bevel gear 104, and intermeshing with same, is a bevel pinion 114, which is secured upon the shaft 108$^a$, journaled similarly to 108 in bracket 103 and sliding block 12. The outer end of shaft 108$^a$ has secured to its end, a bevel pinion 115, which intermeshes with bevel gear 104$^a$, and intermeshing with said gear is a second bevel pinion 116 similar to pinion 107. This is secured upon the short shaft section 117, which is journaled as at 118. The outer end of the shaft is provided with a hand crank 119 through which, any movement of the connected gear train just described, may be transmitted to revolve the power shaft. This can be traced as follows: Movement is transmitted through crank 119; shaft 117; bevel pinion 116; bevel gear 104$^a$; pinion 115; shaft 108$^a$; bevel pinion 114; bevel gear 104; bevel pinion 113; shaft 112; spur gear 111; spur gear 110, which finally revolves the worm shaft 92, which is called a secondary power arm.

The intersection device consists of the hub member 82, upon which is formed, or otherwise secured, a pair of worm wheels 81 and 109, with which the primary and secondary power arms, or worm shafts 72 and 92 are adapted to intermesh. The hub member is carried by a plate 120, which in turn is held in place by a stud extension 121, secured to the sleeve 93. The intersection device is otherwise composed of a series of superposed disks 122, 123, 124, 125 and 126, between which the sleeve members 73 and 93 are formed. The disks are secured together in any suitable manner, and are preferably provided with ball-bearing connections as indicated at 127. The lower gun arm previously described, and indicated by numeral 30, is also carried by a sleeve member indicated at 128. The operation and function of the intersection device, composed of the hub member 82, and sleeves 73, 93 and 128, and the several disks, will later be described.

The plotting table is provided with a fixed limb indicated at 22. This is a semicircular metal piece attached to the longitudinal adjusting slide 29 by a screw 22ª. The limb carries the degree index pointer of the gun arm azimuth circle indicated at 23, and the index or dial for reading the fractions of the degree. The gun arm pintle generally indicated at 24 is a pivot for the gun arm azimuth circle 26 and azimuth correction device 25. The movable limb, or gun arm azimuth circle, indicated at 26 has gear teeth 27 on its outer edge, which mesh into the pinion, which actuates the mechanism and tally dial 28' of the hundredths degree dial 27ª. The limb is also centered on the gun arm pintle. The azimuth correction device, indicated at 25, is an indicator and micrometer for mechanically making azimuth corrections.

The degree tally indicator shown at 28' is a device for indicating the angular travel of the target during the predicting interval, and is on the left of the gun arm azimuth circle. Over the face of the dial moves a hand, the reading of which gives the angular travel in reference numbers for use on the deflection board. (The dials are here marked in reference numbers, running from "0" to "30". The origin time zero being 15.)

(The pintle member, indicated at 24, is mounted in journal member 28, carried by a slidable bracket 29, adjustably secured on the top base line strip 6).

The gun arm proper consists of two separate arms—one horizontally mounted above the surface of the table, and one below the surface of the table. The lower arm consists of a shaft 30 having a spiral groove 31 formed on the surface throughout its length. The inner end of the arm is journaled as at 32 in an extension formed on the lower end of the pintle 24. The outer end of the shaft passes through the intersection device, generally indicated at 33. See Fig. 24. The upper gun arm which extends above the surface of the table, consists of a worm-shaft 34, to which revolving movement is transmitted through the following gear train.

Figure 7:
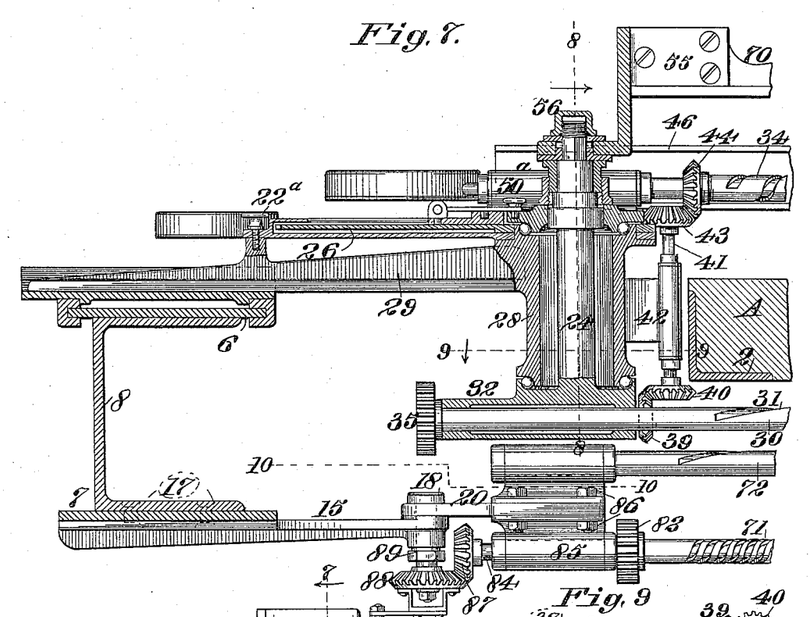
Fig. 7 is an enlarged vertical longitudinal section on line 7—7 of Fig. 8, showing the pintle center.
Figures 8, 9, 10:
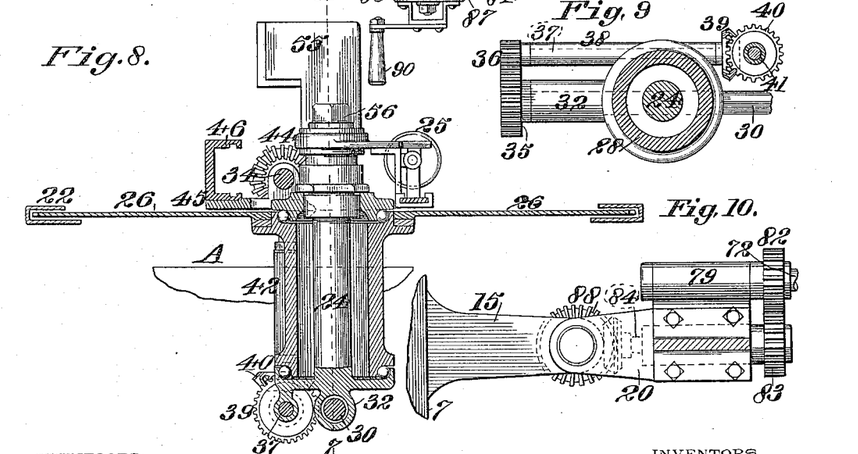
Fig. 8 is a vertical transverse section on line 8—8 of Fig. 7, showing the pintle center.
Fig. 9 is a horizontal section on line 9—9 of Fig. 7.
Fig. 10 is a detail plan view taken on line 10—10 of Fig. 7.

Referring to Figs. 7 and 9, the gear connections from the lower gun arm to the upper gun arm can be traced as follows: Suitably secured to the inner end of shaft 30 is a spur-gear 35, and intermeshing with said gear is a one-to-three driven pinion 36; this is secured upon a short shaft 37 as at 38 on an extension formed on the lower end of the pintle member, and on the opposite end of the shaft 37 is secured a bevel gear 39, which intermeshes with a similar gear 40, secured on the lower end of a vertically positioned shaft 41, journaled in an extension bracket 42, secured upon the pintle bearing 28. Secured to the upper end of the shaft 41 is another bevel gear 43, which intermeshes with a bevel gear 44, secured upon the inner end of worm-shaft 34, which has previously been described as the upper gun arm.

Suitably secured as at 45 is a channel beam 46; this extends outwardly in a position parallel with the upper gun arm, and the outer end of said beam is suitably secured as at 47 in a carriage member 48, which is mounted upon rollers 49, supported upon a semi-circular track-way 50, suitably secured upon the upper surface of the plotting board A. See Fig. 1. The inner end of the upper gun arm 34 is journaled as at 50ª in bracket extensions, formed on the side of the upper end of the pintle member, and the outer end of said arm is journaled as at 51 in carriage 48. The channel-beam is provided as a guide for a slidably mounted bracket 52, having a sleeve 52' formed thereon, through which the upper gun arm, or worm-shaft 34 passes, and is also used as a beam to eliminate deflection. A pin 53 secured in the sleeve, and projecting down into engagement with the groove in the worm-shaft will feed the sleeve with connected bracket member 52 outwardly or inwardly with relation to the channel-arm 46, according to the direction of revolution of shaft 34. The carriage member carries the outer end of the channel arm 46; also supports the worm-shaft 34. The inner end of the range scale 54 is secured to an extension bracket 55, secured to the top of the pintle member by a nut 56, and the outer end of same is supported by means of a carriage 48ª, which is supported by rollers 49ª, adapted to travel on track 50; the range scale is considerably elevated above the channel arm, and can thus swing above same in either direction. The outer end of bracket 52, or that portion which projects beyond the sleeve member 53 is fork-shaped. Mounted in a universal joint indicated at 57, is a tubular member 58, in which is slidably mounted a rod 59. Formed on the lower end of said rod is a universal joint 60, and secured to said universal joint is a shoe 61 on which is mounted a finger-actuated marking device, generally indicated at 62. Secured to the upper end of the tubular member 58 is an arm 63, the outer end of which is rounded and pointed as indicated at 64, and secured to one of the forks of the bracket extension 52 is a stationary arm 65, in which is formed a depression 66, with which the pointed end 64 of arm 63 is adapted to register. The upper end of the tubular extension 58 is provided with a secondary rod extension 67, which passes through the block 68, slidably mounted on the outer edge of the range scale 54. The sliding block 68 is also provided with a pointer 69 from which the exact range may be taken.

The construction or position of the range scale forms one of the important features of the present invention, and this, together with the sliding block 68, rod 67, tubular member 58, rod 59 and shoe 61, with connected universal joints previously described forms as a whole, a medium which will hereinafter be referred to as the set-forward point predicting device.

Figure 12:
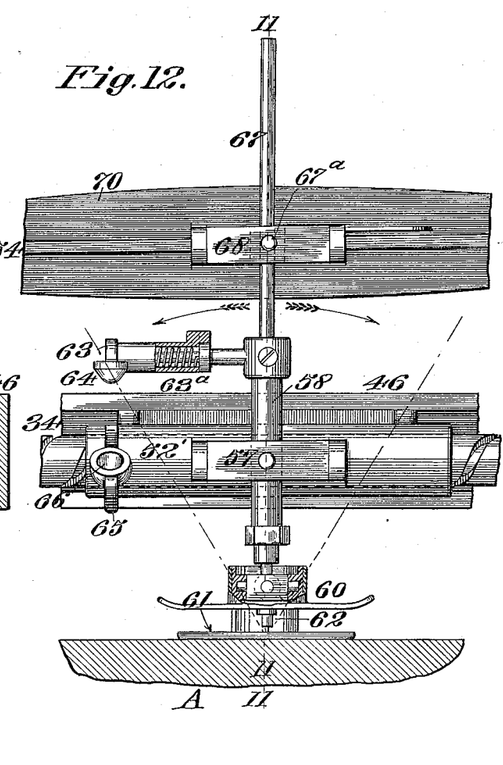
Fig. 12 is a front elevation of the time of flight predicting device.

The range scale consists of strip of metal of suitable thickness, as indicated in Fig. 12; this is formed integrally with, or otherwise secured to a vertically positioned arm 70. The inner end of the range scale starts from a given point, and the outer end of the scale is positioned at an elevation considerably higher, or above that of the inner end of the scale. The line taken between the inner lower point and the outer elevated point is a plotted incline, or curve which gradually increases in elevation with relation to the surface of the board. The block 68 which is guided and slidably mounted on the outer edge of the scale will thus gradually climb upward upon rod 67 as bracket 52 with connected parts are moved outwardly with relation to the gun arm. The action of this part of the mechanism will hereinafter be described.

A considerable number of men are necessary for the successful operation of the board. These may generally be enumerated as follows: The chief plotter and assistant plotter; two arm setters; that is, one man for the operation of the primary station arm, and one man for the operation of the secondary station arm, and an observer and a reader at each observing station, of which there are two or three.

All means for correcting ranges and for finding deflections are secured by reference to tables and charts contained in the plotting room, and this is accomplished in the usual manner by individuals stationed there for this purpose.

Figures 16, 18:
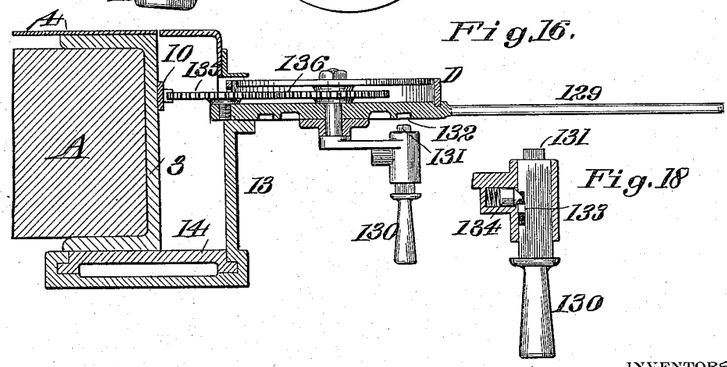
Fig. 16 is a cross section on line 16—16 of Fig. 15.
Fig. 18 is a cross section of the crank arm in line 18—18 of Fig. 17.

The operation of the plotting board will be as follows: The observer at each station is first notified by the battery commander, to observe upon a certain target, and when thus notified, will continue to observe at predetermined intervals, which are indicated by the ringing of electric bells; these bells usually ring every thirty seconds. The observers will then set their instruments upon the target, and the readers will immediately telephone to the plotting-room, the exact azimuths. Two readings will then be received in the plotting-room—one from the primary station and one from the secondary station. The arm setter controlling the primary arm will then grasp handle 129 and crank 80, and swing the arm to approximately the required degree, overcoming any resistance to motion by turning crank 80; for instance, the azimuth for the primary setter may be thirty degrees and ninety-five hundredths. The primary station arm setter swings the arm through the medium of the handle and crank to approximately 30 degrees. He then grasps a hand crank 130, which is mounted upon the lower side of the hundredths dial D, and revolves this gear until the indicator upon the hundredths dial indicates the exact reading—30 degrees and 95 hundredths. The arm may then be locked in this position through the following mechanism: The handle 130 of the crank arm is slidably mounted as indicated in Fig. 18. The upper end of the handle is provided with a dog 131, which is adapted to be brought into engagement with the teeth of a circular rack 132, formed on the surface of the hundredths dial. That portion which is intermediate with the handle 130 and the dog 131, as indicated at 133, is provided with a pair of notches and a spring actuated pawl 134; this is adapted to lock the handle either in a raised or lowered position. The hundredths degree dial is operated in the usual manner through the medium of the intermeshing gears 135 and 136. As above described, the moment the desired setting has been secured, it is only necessary to throw the dog 131 into engagement with the teeth on the lower side of the hundredths dial. The primary arm will then be locked, and the arm setter calls—set. The operation of the secondary arm is exactly similar to that of the primary arm. The arm is swung back and forth, through the medium of a handle 129ᵃ, and the hundredths degree setting is secured through the medium of the hundredths dial, indicated at E. This is also provided with an operating crank and locking mechanism similar to that just described in connection with the hundredths dial, indicated at D, on the primary station arm.

Figures 1, 2:
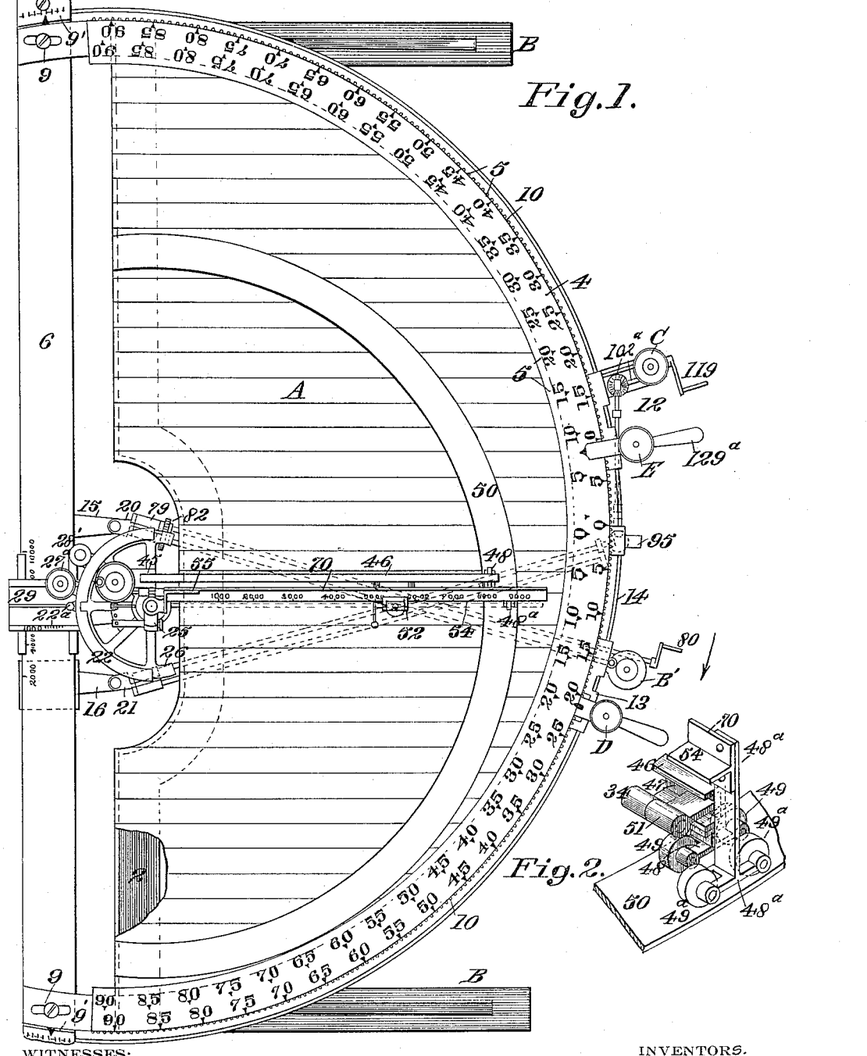
Figure 1 is a plan view of the plotting board.
Fig. 2 is a perspective view of the supporting mechanism on the outer end of the gun arm with connected parts.
Figures 11, 13, 14:
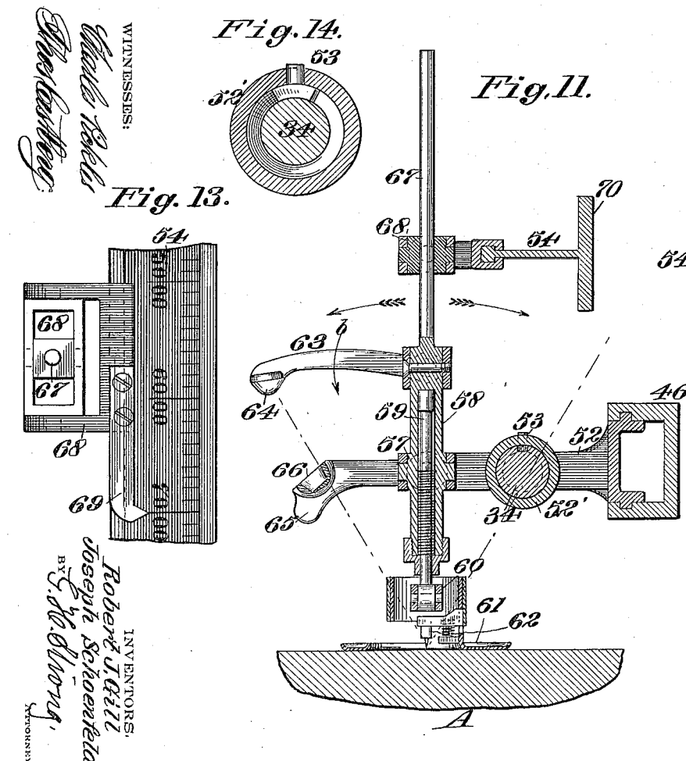
Fig. 11 is a vertical cross section on line 11—11 of Fig. 12.
Fig. 13 is a detail plan view of the range scale, showing the position of the sliding block and indicating pointer.
Fig. 14 is a detail view of the connection between the traveling sleeve and gun arm.

By referring to Fig. 1 it will be seen that the point of intersection between the primary and secondary arms will move outwardly and inwardly with relation to the gun arm pintle, accordingly as the position of said arms vary. It therefore becomes necessary to provide means for automatically shifting the intersection device to maintain this at the exact point of intersection of the arms; this is accomplished through the medium of the primary and secondary power shafts and the respective worm wheels 81 and 109, and the action will be as follows: Supposing that the secondary arm has been set and locked, and that it is desired to move the primary arm in the direction of arrow a. The primary arm setter will then grasp handle 129 with his left hand, and hand-crank 80 with his right hand. The power primary shaft is then revolved in the desired direction; the revolving motion thus transmitted will cause the primary power shaft, or worm shaft to revolve the worm wheel 81; or in other words, tend to feed this closer toward the center of the gun arm pintle. The opposite power shaft, or the secondary power shaft, will then act as a rack upon which the worm wheel 109 will roll. The intersection device will thus be moved inwardly or outwardly with relation to the gun arm pintle, and the inward or outward movement of the same will transmit motion to revolve the lower gun arm, spiral shaft 30, the primary shaft 71 and the secondary spiral shaft 71; that is, the inward or outward movement of the sleeve members 128, 93 and 73 will cause the spiral shaft to revolve, and the action of the lower gun arm and the upper gun arm will be as follows: The turning movement of spiral shaft 30 will be transmitted through gear 35, pinion 36, gears 39 and 40, and gears 43 and 44 to revolve the upper gun arm shaft, known as worm shaft 34. The revolving movement transmitted to this shaft, which passes through a sleeve 53, will feed bracket 52, inwardly or outwardly along the channel arm 46, according to the direction of revolution of the upper gun arm, or what is known as worm shaft 34. The pitch of the worm shaft is such that sleeve 53, with connecting bracket 52, and set-forward point predicting device which is carried by same, will always retain a position directly above the intersection device 33, and always move in unison with same. The manner in which the set-forward predicting device is operated, will be explained as follows: Supposing that the readers at the primary and secondary stations have telephoned in the azimuth from the respective stations, and that the arm setters of the primary and secondary arms have called—set; the chief plotter will then depress the marking device 61, and hold this in engagement with the table until a new setting has been secured. The azimuth readings are received every thirty seconds from the primary and secondary station observers, and the setting of the arms, and the depression of the marking device 61 is accomplished during the operation of this time interval. One arm setting has now been made, and the marking device 61 has been brought into engagement with the surface of the table. The moment the time-interval bell rings, a new azimuth will be telephoned over the line to the plotting-room, and the arm setters will immediately proceed to move the arms to the necessary azimuth reading. The moment this has been accomplished, they call—set. The chief plotter immediately reads the range of the set-forward point, after which he will then release the marking device 61, and move the shoe with connectings 59 and 58, and extension 67 into approximate vertical position. The actual vertical position is produced by depressing lever 63 down until point 64 of same in the direction of arrow b is brought into registering position with socket 66; this insures an exact vertical position of the shoe of the marking device, with relation to the shaft 59 to 58, etc. The marking device is again depressed and lever 63 released; this is automatically turned to the normal position indicated in Fig. 11, by the action of spring 63ª, shown in Fig. 12. Two markings have now been made upon the surface of the table during the given time interval of 30 seconds. A third reading will, after the lapse of thirty seconds, again arrive at the plotting-room, and the arm setters will again call—set, the moment the respective arms have been placed in azimuth. The shifting of bracket 52, which is caused by the revolution of the upper gun arm shaft 34, and the moving in azimuth of shaft 34, which in turn is transmitted through the shifting of the intersection device 33 and the spiral shaft 30 and connected gear-train previously described, will cause shaft 59, tube 58 and extension shaft 67, to assume an angular position in the direction of travel of target, with relation to the marking point 61, which will cause scale 54 to move in azimuth so that point 67ª will have the azimuth as well as the range of the set-forward point. If the target is traveling directly away from the gun, then it can be seen that the set-forward point predicting device, consisting of shaft 59, tube 58 and extension-shaft 67, will move outwardly; that is, the upper end of extension-shaft 67 will swing in an arc parallel with the gun arm, directly away from the gun arm pintle; this will cause the sliding block 68 to move outwardly upon the edge of the range scale 54, and the range indicated by the pointer 69, when the arms are again set; that is, the second setting, and following settings will be the set-forward range for the rifle, or the range at which the gun should be set for the next bell, or when the firing bell rings. This range is communicated to the gun crew, and the gun should be fired on the next bell after the range to the set-forward point is received.

Figure 26:
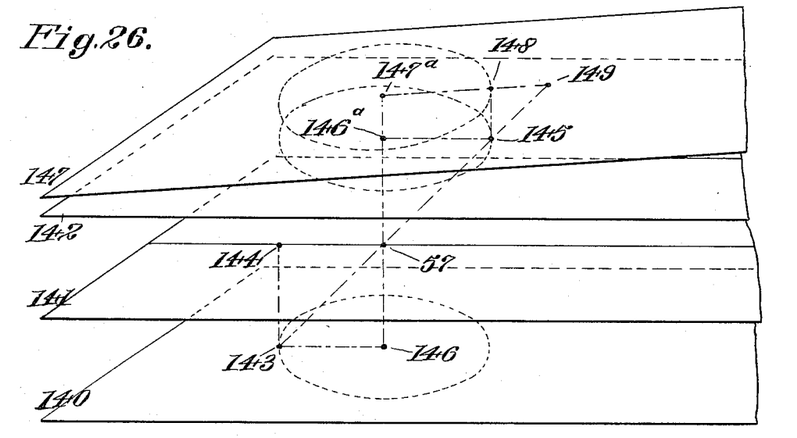
Fig. 26 is a diagrammatic view, showing the manner in which the range of the set-forward point is attained.
Figure 27:
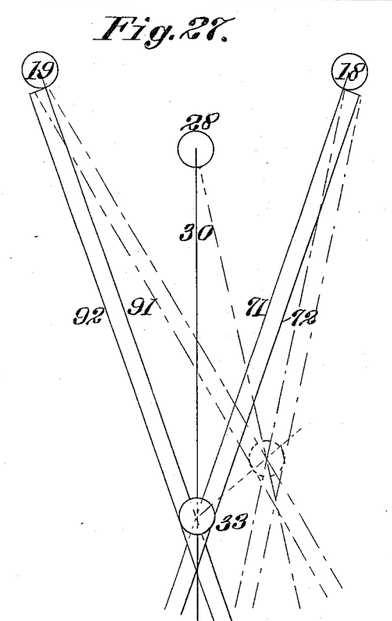
Fig. 27 shows the position of the primary and secondary arms, together with the gun arm below the surface of the plotting board.
Figure 28:
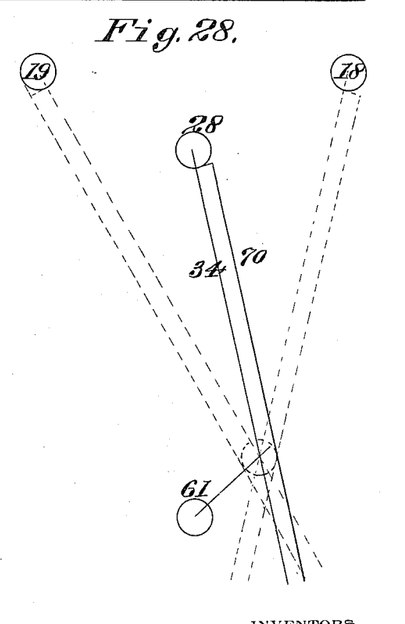
Fig. 28 is a diagrammatic plan view, showing the position of the gun arm on top of the board.

The method by which the set-forward point is determined will be further described by referring to the diagrammatic view of Fig. 26. As above described, the range scale is set on the sliding incline, or groove, which actually increases the elevation with relation to the surface of the table. The inclined position of this scale allows for the time of flight. Supposing the range scale 54 was placed in a position exactly parallel with relation to the surface of the table, and with it was placed at an elevation above universal joint 57, equal to the distance between the table surface and this pivot point; this is indicated in Fig. 26 by planes 140, 141 and 142. Plane 140 indicates the table surface; plane 141 indicates the pivot point 57, and plane 142 contains the plane which contains point of prediction 145, and also contains point 146ᵃ. The distance between points 146ᵃ and 145 indicate predicted travel of target. The position of the marking device at the second reading is indicated by a point at 143, and the vertical position of same is indicated by the downward line drawn between point 143 and point 144. The dotted line position indicated between point 143 and point 149 is the position that the set-forward predicting device attains when the arms have been set according to the azimuth reading received at the third bell. Actual distance of travel during the last thirty seconds could again be secured by returning the set-forward predicting device to the vertical position to the mark which is indicated by the point at 146. The dotted line connecting points 143 and 146 indicates the actual distance that the target has traveled during the last 30 seconds. It is desirable to secure the set-forward point in relation to the distance of travel of the target during the time of flight of the projectile, the marking implement of the set-forward predicting device is therefore not released when the third setting is being made. The set-forward predicting device will therefore assume the angular position indicated by the dotted line connecting points 143 and 145. The dotted line connecting point 145 and point indicated at 146ᵃ will now indicate the range scale, providing this is in the parallel position with relation to the surface of the table, if the gun is fired at the fourth bell. The range could thus be read at point 145 and communicated to the gun crew. It would, however, be found that the projectile, if fired at this range, would miss the vessel by a considerable number of yards, as it is necessary to take into consideration the time of flight of the projectile and the distance that the ship would travel during the time of flight of the projectile. It is with this object in view of determining the exact range of the target when the projectile should strike, and this is accomplished by representing the range scale 54, by plane 147, an increase of range will be obtained, being shown between points 148 and 149. The height of plane 147 above plane 142 is governed by the time in seconds that it takes a projectile on being fired from a rifle to reach the predicted point. The inclined position of the range scale will cause the sliding block 68 to move upwardly with relation to pivot 57. The arc of travel of the sliding block will thus be greater as the elevation of the range scale increases with relation to the pivot point. The indicated position of the range scale is indicated by plane 147, and the variation between the parallel point of travel and the angular path of travel is indicated by points 148 and 149. The dotted line indicating these two points will thus indicate the distance that the ship travels during the time of flight of the projectile. The set-forward point, which includes the travel of the ship during the time interval, and also the distance which the ship travels during the time of flight of the projectile is thus instantly indicated and read on the range scale the moment the second setting of the arm has been accomplished. The set-forward point is then instantly communicated to the gun crew, and the time interval between the second and third bells may be used for the purpose of setting the gun to the set-forward point range, which is the point at which the projectile and the target should meet. The method of determining the set-forward firing point is one of the novel and important features here accomplished, purely through mechanical means. This eliminates the possibility of personal error, and furthermore, increases the speed of operation. It has already been determined that the use of the present device will reduce the time interval between bells from thirty to ten seconds. No mistake can possibly be made, providing the primary and secondary arms are set at the correct azimuth. The time of flight that this plotting board uses to determine the set-forward point is: the given time of flight to the range of that set-forward point. The time of flight slide is the device by means of which the time of flight in seconds of the projectile can be mechanically used as a basis to express the travel of the target in yards during the time of flight of the projectile. The reason that the basis for finding the range of the set-forward point is in the time of flight at the range of that set-forward point is: that the time of flight slide and range scale are always at the same relative range as the range scale is located on the time of flight slide. The operation of the system used in connection with the plotting board will be still further explained.

Two instruments, called observing instruments, are set at each end of a line of known length; these observing points are called base end, or observing stations. The observing stations are so arranged that when the instruments are focused on the vessel, a dial below the instrument registers the degrees of azimuth of the vessel, with relation to the position of the guns of the battery. Since each battery has its own base line and observing stations, which are called the primary and secondary stations, it follows that the azimuth or position of the vessel sighted by the observing instruments will differ when sighted from two different stations. It can therefore be seen that the readings of the two instruments will be different. Each of the base end stations are connected by a telephone with two men in the plotting room, known as the arm setters. The duties of these two men are to set their respective station arms in azimuth as they receive the data from their respective base-end stations. The position of the vessel sighted from the base and stations is thus indicated on the plotting board which is laid out on a scale of 300 yards to the inch. The position of the vessel with respect to the position of the guns may be accurately determined. It is now customary for the base end stations to observe every thirty seconds. The marker 61 which is operated by the chief plotter will thus be shifted every thirty seconds, and the course and speed of the vessel may thus be determined and marked on the face of the board. This operation is known as tracking the vessel. The set-forward point may be determined after each new setting, after two settings have been made. The operation of setting the primary and secondary arms and obtaining the range of the set-forward point is absolutely simultaneous, for the simple reason that the set-forward point is obtained automatically and mechanically with the setting of the primary and secondary arms.

The plotting board here shown may be used in every instance and for every purpose where the Whistler-Hearn board is used; that is, it may be used in connection with the horizontal base system and the vertical base system; it may be operated by the auxiliary system, and by the emergency base system. It may also be used for re-locating the target. In this instance, lock 160 in Figs. 3 and 6 may be depressed to lock the gun arm at the given azimuth. The danger of personal error is eliminated in the improved board, by reason of the setting automatically in azimuth of the gun arm, and the instantaneous finding of the set-forward point by automatic operative means. Under the old system, before the set-forward point was found, the arms must be set to the azimuth numbers of the board per data from the observing stations. After the two arms are set, the plotter marks the intersection by means of the targ. The intersection being marked, the plotter calls—mark, to the arm setters. The arm setters then unlock the respective arms, and move them well out of the way of the tracking marks. The plotter then measures the travel of the target during the last four readings, by means of a rule. It is necessary to measure the travel from the last four readings, because this will enlarge the scale of travel to 100 yards to the inch. This enlarging of the scale lessens the possibility of error in reading travel, as divisions on the scale are rendered three times larger. The average travel being found, the plotter announces the travel to the man operating the time of flight scale, who adds the travel during these four observations to the travel during the time of flight, the result is called to the plotter who lays off this distance in yards with the travel scale in line of direction of travel of the target. The set-forward point being marked by the plotter, the plotter then brings the gun arm up to the point. The range is then measured by bringing the targ against the division of the gun arm scale opposite the set-forward point. The plotter then calls the range to the man, who transmits the range to the gun crew. On the improved board, as soon as the arms are set in azimuth per observation station data, the arm setters call—set. The plotters can then immediately read the range of the set-forward point, from point that would lead to facilitate operation and speed in making use of the observation station data, and ease in reading ranges of the gun arm scale with accuracy have been taken into consideration. The value of such advantages will be readily recognized when it is considered that but few seconds are allowed to obtain the set-forward point under present conditions. In the heat and excitement of action, when the men are working under great strain, accuracy is necessarily sacrificed to obtain speed in firing, and vice versa.

On the improved board, both speed and absolute accuracy are obtained without subjecting the men to any nervous strain, for the simple reason that the mechanism here provided, mechanically and automatically indicates the set-forward point the moment the arms are set.

The materials and finish of the several parts of the invention are such as the judgment and experience of the manufacturer may dictate.

Having thus described our invention, what we desire and claim to secure by Letters Patent is:

1. In a plotting board, a pair of station arms normally crossing each other, a pivoted gun arm, and means having journals for each of said arms for retaining the gun arm over the point of intersection of the station arms.

2. In a plotting board, a base line strip, a pair of station arms pivotally secured to the base line strip, said arms normally crossing each other, a gun arm, and means connected with said gun arm for automatically positioning it over the point of intersection of the station arms.

3. In a plotting device, a board, a pair of station arms, normally crossing each other, a gun arm, means for automatically positioning the gun arm over the point of intersection of the station arms, and means for marking said point on the board.

4. In a plotting device, a board, a pair of station arms normally crossing each other, a gun arm, means for automatically positioning the gun arm over the point of intersection of the station arms, means for marking said point on the board, said means comprising a shoe having an opening formed therein, a needle depressible through said opening, a spring for normally holding the needle above said opening, and means for depressing the needle to mark a point on the board.

5. In a plotting device, a table, a pair of station arms pivotally mounted below the surface of the table, said arms being so positioned as to normally cross each other, a lower gun arm mounted below the surface of the table, means for retaining and moving said arm with the point of intersection of the station arms, and means for locating and marking the point of intersection on the upper surface of the table.

6. In a plotting device, a table, a pair of station arms pivotally mounted below the surface of the table, said arms being so positioned as to normally cross each other, a lower gun arm mounted below the surface of the table, means for retaining and moving said arm with the point of intersection of the station arms, an upper gun arm mounted above the surface of the table, means for moving the upper arm in unison with the lower arm, and means operated by said upper gun arm for locating and marking on the upper surface of the board the point of intersection of the station arms below the board.

7. In a plotting device of the character described, a table, a set-forward point predicting device, comprising a supporting member, a bracket slidably mounted thereon, a universal joint in said bracket, a telescoping member carried by said universal joint, a range scale positioned on an incline with relation to the table surface, a block slidably mounted on one side of said scale, a universal bearing in said block through which the upper end of the telescoping member projects, and means whereby the lower end of the telescoping member may be temporarily held on the table surface.

8. In a plotting device of the character described, a table, a set-forward point predicting device, comprising a supporting member, a bracket, a universal joint in said bracket, a telescoping member carried by said universal joint, a range scale positioned on an incline with relation to the table surface, a block slidably mounted on one side of said scale, a universal bearing in said block through which the upper end of said telescoping member projects, a universal joint on the lower end of the telescoping member, a shoe carried by said joint, and a spring-actuated pointer, depressible through the shoe to mark a point on the table surface, and to temporarily retain the shoe in a fixed position.

9. In a plotting device of the character described, a table, a set-forward point predicting device, comprising a supporting member, a bracket, a universal joint in said bracket slidably carried by said member, a telescoping member carried by said universal joint, a range scale positioned on an incline with relation to the table surface, a block slidably mounted on one side of said scale, a universal bearing in said block through which the upper end of the telescoping member projects, means whereby the lower end of the telescoping member may be temporarily held on the table surface, and means for holding the telescoping member in a vertical position.

10. In a plotting device of the character described, a table, a set-forward point predicting device, comprising a supporting member, a bracket, a universal joint in said bracket slidably carried by said member, a telescoping member carried by said universal joint, a range scale positioned on an incline with relation to the table surface, a block slidably mounted on one side of said scale, a universal bearing in said block through which the upper end of the telescoping member projects, means for temporarily holding the lower end of the telescoping member on the table surface, and means for holding the telescoping member in a vertical position, said means comprising an extension arm on the telescoping member, a spring-actuated lever pivotally mounted on said extension, a pointer on the outer end of the lever, and a socket formed on a sliding bracket with which the pointer is adapted to register.

11. In a plotting device of the character described, a table, a set-forward point predicting device, a supporting member and a sliding bracket, a universal joint in said bracket, a telescoping member carried by said universal joint, a range scale positioned on an incline with relation to the table surface, a block slidably mounted on one side of said scale, a universal bearing in said block through which the upper end of the telescoping member projects, a universal joint on the lower end of the telescoping member, a shoe carried by said joint, and a spring-actuated pointer depressible through the shoe to mark a point on the table surface, and to temporarily retain the shoe in a fixed position, and means for holding the telescoping member in a vertical position.

12. In a plotting device of the character described, a table, a set-forward point predicting device, comprising a supporting member and a sliding bracket, a universal joint in said bracket carried thereby, a telescoping member carried by said universal joint, a range scale positioned on an incline with relation to the table surface, a block slidably mounted on one side of said scale, a universal bearing in said block, through which the upper end of the telescoping member projects, a universal joint on the lower end of the telescoping member, a shoe carried by said joint, and a spring-actuated pointer depressible through the shoe to mark a point on the table surface, and to temporarily retain the shoe in a fixed position, and means for holding the telescoping member in a vertical position, said means comprising an extension arm on the telescoping member pivotally mounted on said extension, a pointer on the outer end of the lever, and a socket formed on the sliding bracket with which the pointer is adapted to register.

13. In a plotting device, a base line strip, primary and secondary station blocks, a semi-circular board, a semi-circular track on the outer end of said board, brackets pivotally mounted on each station block, a pair of journal members on each bracket, a primary sliding block, carried by the segmental track, a primary station arm carried at the inner end of the primary station block, and at the outer end of the primary sliding block, said arm comprising a worm power shaft and a spiral shaft, means for turning the worm power shaft, a secondary station arm carried at the inner end by the secondary block and at the outer end by the auxiliary sliding block, said secondary station arm comprising a worm power shaft and a spiral shaft, said shafts crossing the primary arm shafts, means for turning the secondary worm power shaft, an arm intersecting device, worm wheels carried by said device, with which the respective worm power shafts are engageable, sleeve members carried by the arm intersecting device through which the respective spiral shafts pass, a pin in each sleeve, engageable with the spiral in each shaft to revolve the shafts when the arm-intersecting device is moved, a gun arm pintle carried by the base line strip, a gun arm carried by said pintle member, said gun arm comprising a spiral shaft and a worm shaft, a sleeve member carried by the arm-intersecting device through which said spiral shaft extends, a pin in said sleeve, engageable with the spiral in the shaft, and driving connections formed between the gun arm spiral shaft and the gun arm worm shaft.

14. In a plotting board of the class described, an intersecting device, a base line strip, a primary station arm pivotally secured to the base line strip, a secondary station arm pivotally secured to the base line strip, said arms extending through the intersecting device below the surface of the board, means for independently moving each arm, and means on each arm for moving the intersecting device.

15. A plotting device of the class described, a board, an intersecting device, a base line strip, a primary station arm pivotally secured to the base line strip, a secondary station arm pivotally secured to the base line strip, said arms extending through the intersecting device below the surface of the board, means for independently moving each arm, and means on each arm for moving the intersecting device, a gun arm pintle secured on the base line strip, and a gun arm pivotally mounted on the pintle, said arm comprising a spiral shaft, positioned below the board and extending through the intersecting device, and a worm shaft extending above the surface of the board.

16. In a plotting device of the class described, a board, an intersecting device, a base line strip, a primary station arm pivotally secured to the base line strip, a secondary station arm pivotally secured to the base line strip, said arms extending through the intersecting device below the surface of the board, means for independently moving each arm, means on each arm for moving the intersecting device, a gun arm pintle secured to the base line strip, and a gun arm pivotally mounted on the pintle, said arm comprising a spiral shaft, positioned below the board, a channel arm pivotally mounted on the pintle, a roller bearing to support the outer end of said arm, a bracket slidably mounted in the channel arm through which the worm shaft extends, a driving connection between the worm shaft and bracket, means on the intersecting device for revolving the spiral shaft, and means for connecting the spiral shaft with the worm shaft, to transmit revolving motion to the worm shaft.

17. In a plotting board of the class described, a board, an intersecting device, a base line strip, a primary station arm pivotally secured to the base line strip, a secondly station arm pivotally secured to the base line strip, said arms extending through the intersecting device below the surface of the board, means for independently moving each arm, means on each arm for moving the intersecting device, a gun arm pintle secured to the base line strip, and a gun arm pivotally mounted on the pintle, said arm comprising a spiral shaft, positioned below the board, a worm shaft extending above the surface of the board, a channel arm pivotally mounted on the pintle, a roller bearing to support the outer end of said arm, a bracket slidably mounted on the channel arm through which the worm shaft extends, a driving connection between the worm shaft and bracket, means on the intersecting device for revolving the spiral shaft, means connecting the spiral shaft with the worm shaft to transmit revolving motion to the worm shaft, a set-forward point predicting device carried by the bracket, a range scale carried by the channel arm, said scale being inclined with relation to the upper surface of the board, and means whereby the range of the set-forward point may be indicated on the scale.

18. In a plotting board, a pair of station arms normally crossing each other, a pivoted gun arm, and means for automatically positioning the gun arm over the point of intersection of the station arms, said means comprising an intersecting member through which the station arms and gun arms pass.

19. In a plotting board, base line strip, a primary station block, a secondary station block, a semi-circular board, a semi-circular track on the outer end of said board, brackets pivotally mounted on each station block, a pair of journal members on each bracket, a primary sliding block and an auxiliary sliding block, carried by the segmental track, a primary station arm carried at the inner end by the primary station block, and at the outer end by the primary sliding block, said arm comprising a worm power shaft and a spiral shaft, means for turning the worm power shaft, a secondary station arm carried at the inner end by the secondary block, and at the outer end by the auxiliary sliding block, said secondary station arm comprising a worm shaft and a spiral shaft, said shafts crossing the primary arm shafts, means for turning the secondary worm power shaft, an arm intersecting device comprising worm wheels with which the respective worm power shafts are engageable, sleeve members carried by the arm-intersecting device through which the respective spiral shafts pass, a pin in each sleeve, engageable with the spiral in each shaft, to revolve the shafts when the arm-intersecting device is moved, a gun arm pintle carried by the base line strip, a gun arm carried by said pintle member, said gun arm comprising a spiral shaft and a worm shaft, a sleeve member carried by the arm-intersecting device through which said spiral shaft extends, a pin in said sleeve, engageable with the spiral in the shaft, and driving connections formed between the gun arm spiral shaft and the gun arm worm shaft, a channel arm parallel with the gun arm worm shaft, and movable radially with same, a bracket slidably mounted on the channel arm, a nut on the bracket through which the gun arm worm shaft extends, and by which the bracket may be moved along the channel arm, and a marking device in the bracket for indicating the position of same.

20. In a plotting board, a base line strip, a primary station block, a semi-circular board, a semi-circular track on the outer end of said board, brackets pivotally mounted on each station block, a pair of journal members on each bracket, a primary sliding block and an auxiliary sliding block, carried by the segmental track, a primary station arm carried at the inner end by the primary station block, and at the outer end by the primary sliding block, said arm comprising a worm power shaft and a spiral shaft, means for turning the worm power shaft, a secondary station arm carried at the inner end by the secondary block, and at the outer end by the auxiliary sliding block, said secondary station arm comprising a worm shaft and a spiral shaft, said shafts crossing the primary arm shafts, means for turning the secondary worm power shaft, an arm intersecting device, worm wheels carried by said device and with which the respective worm power shafts are engageable, sleeve members carried by the arm intersecting device through which the respective spiral shafts pass, a pin in each sleeve, engageable with the spiral in each shaft to revolve the shafts when the arm-intersecting device is moved, a gun arm pintle carried by the base line strip, a gun arm carried by said pintle member, said gun arm comprising a spiral shaft and a worm shaft, a sleeve member carried by the arm-intersecting device through which said spiral shaft extends, a pin in said sleeve, engageable with the spiral in the shaft, and driving connections formed between the gun arm spiral shaft and the gun arm worm shaft, a channel arm parallel with the gun arm worm shaft, and movable radially with same, a bracket slidably mounted on the channel arm, a nut on the bracket through which the gun arm shaft extends, and by which the bracket may be moved along the channel arm, a range scale carried by the channel arm, means carried by the bracket members for providing the set-forward range, and means carried by the bracket for marking on the surface of the table the point of intersection of the station arms below the table.

21. In a plotting board, a base line strip, a bracket adjustably secured to said strip, a pintle member mounted on said bracket, a gun arm mounted on the pintle member, and a pair of station arms crossing each other and said gun arm at a common point of intersection, 22. In a plotting board, a base line strip, a bracket adjustably secured to said strip, a pintle member mounted on said bracket, a gun arm mounted on the pintle member, a stationary limb secured to the bracket, a movable limb mounted on the pintle member and movable with the gun arm, and means for locking the movable limb on the stationary limb, said means comprising a lever pivotally mounted on the stationary limb, and a pivoted locking cam on the end of said lever, engageable with the movable limb.

23. In a plotting board, a primary and secondary arm composed of a plurality of members, an intersection device through which said members pass, and means for moving the intersection device to a given position along either arm.

24. In a plotting board, a pair of station arms normally crossing each other, a gun arm, and means for automatically positioning the gun arm over the point of intersection of the station arms, said means comprising an intersecting member through which the station arms and gun arm pass, said intersecting member comprising a hub composed of two worm gear wheels, which engage with the station arms, and means for guiding said hub on the station arms.

25. In a plotting device, a pair of station arms each composed of a plurality of parallelly disposed members adapted for synchronous rotation about their longitudinal axes.

26. In a plotting device, a pair of station arms normally crossing each other, each of said arms comprising a plurality of members, and driving connections between said members for rotating them about their longitudinal axes.

27. In a plotting device, a pair of station arms normally crossing each other, each of said arms comprising a worm shaft and a spiral shaft, and an intersection device carrying worm wheels in operative relation to said worm shafts.

28. In a plotting device, a pair of station arms normally crossing each other, each of said arms comprising a worm shaft and a spiral shaft, an intersection device carrying worm wheels in operative relation to said worm shafts, and sleeves carried by said intersection device through which said spiral shafts pass.

29. In a plotting device, a pair of station arms normally crossing each other, each of said arms comprising a worm shaft and a spiral shaft, an intersection device carrying worm wheels in operative relation to said worm shafts, sleeves carried by said intersection device through which said spiral shafts pass, and pins projecting from said sleeves and engaging the spirals in the spiral shaft.

30. In a plotting device, a pair of station arms and a gun arm having a common point of intersection, a worm shaft and a spiral shaft composing each of said station arms and said gun arm, and an intersection device having engagement with the shafts of said station arms and the spiral of said gun arm.

31. In a plotting device, a table, a pair of station arms below said table, a gun arm, a worm shaft and a spiral shaft for each of said arms, and an intersection device below the table having engagement with the shafts of said station arms, and the spiral shaft of said gun arm.

32. In a plotting device, a table, a pair of station arms normally crossing each other located entirely beneath said table, a gun arm comprising a worm shaft and a spiral shaft, said spiral shaft located beneath the table and a worm shaft located above the table, an intersection device having engagement with said station arms and the spiral shaft of said gun arm, and a set forward point predicting device above the table having engagement with the worm shaft of said gun arm.

33. In a plotting device, a table, a pair of station arms normally crossing each other beneath the table, a gun arm having one member thereof above the surface of the table, and a set forward point predicting device actuated by said member.

34. In a plotting device, a table, a pair of station arms located beneath said table, said station arms normally crossing each other, a gun arm having one member thereof above the surface of the table, a set forward predicting device actuated by said member, and an inclined range scale above said table, said set forward point predicting device being guided by the range scale.

35. In a plotting device, a pair of station arms, a gun arm, an intersection device carried by said station arms, and a set forward point predicting device carried by said gun arm, said intersection device and said set forward point predicting device lying directly above each other.

36. In a plotting device in combination, a pair of station arms, a gun arm, and intersection devices carried by said station arms, and a set forward point predicting device carried by said gun arm, said intersection device and said set forward point predicting device lying directly above each other for synchronous and uniform movement.

37. In a plotting board, a pair of pivoted intersecting station arms, a pivoted gun arm having its axis passing through the point of intersection of said station arms, a range scale movable with said gun arm, and means located above the point of intersection of said arms for indicating the range on said range scale.

38. In a plotting board for guns, a primary arm, a secondary arm, and a pivoted gun arm, the axis of all of said arms intersecting each other at a common point, said gun arm comprising an upper and a lower member, an intersecting device through which said primary and secondary arms and the lower member of said gun arm pass, and a range scale adjacent said intersecting device for indicating the range of the gun.

39. In a device of the character described, a plotting board, a primary arm, a secondary arm, a pivoted gun arm, said gun arm being composed of an upper and a lower member, an intersection device below the plotting board through which said primary and secondary arms and the lower member of said gun arm pass, a set forward point device located above said intersection device, and slidably connected to said upper member, a range scale, and means for manually operating said primary and secondary arms to slide said set forward point device along the range scale.

40. In a device of the character described, a pair of station arms, a gun arm having an upper and a lower member, a set forward point device mounted on said upper member and capable of longitudinal movement thereon, an intersection device through which said station arms and the lower member of said gun arm pass, an upwardly curved range scale, and means for operating said station arms to cause the set forward point device to move along the upper member of the gun arm and indicate on the range scale the range of the gun.

41. In a device of the class described, a pair of station arms and a gun arm, an intersection device controlled by said arms and capable of longitudinal movement thereon, a set forward point device adapted for movement simultaneously with said intersection device, and means connected to said set forward point device for indicating the range of the gun.

42. In a plotting board, a primary and secondary arm each composed of a plurality of members, an intersection device through which said members pass, means for moving the intersection device to a given position along either arm, and a set forward point device mounted for moving simultaneously with said intersection device.

In testimony whereof we have hereunto set our hands in the presence of two subscribing witnesses.

ROBERT J. GILL.
JOSEPH SCHOENFELD.

Witnesses:
  A. K. DAGGETT,
  F. L. HENDERSON.

Copies of this patent may be obtained for five cents each, by addressing the "Commissioner of Patents, Washington, D. C."